United States Patent
Gui et al.

(10) Patent No.: US 12,191,746 B2
(45) Date of Patent: Jan. 7, 2025

(54) SPLIT TYPE MOTOR

(71) Applicant: DONGGUAN CHI DRIVE MOTORS CO., LTD, Dongguan (CN)

(72) Inventors: Changqing Gui, Qiyang (CN); Tianyou Cao, Taojiang (CN); Ping Li, Luzhou (CN)

(73) Assignee: DONGGUAN CHI DRIVE MOTORS CO., LTD, Dongguan (CN)

( * ) Notice: Subject to any disclaimer, the term of this patent is extended or adjusted under 35 U.S.C. 154(b) by 236 days.

(21) Appl. No.: 17/993,903

(22) Filed: Nov. 24, 2022

(65) Prior Publication Data
US 2023/0092355 A1    Mar. 23, 2023

(51) Int. Cl.
| | |
|---|---|
| *H02K 5/24* | (2006.01) |
| *H02K 5/06* | (2006.01) |
| *H02K 5/20* | (2006.01) |
| *H02K 7/08* | (2006.01) |
| *H02K 9/06* | (2006.01) |

(52) U.S. Cl.
CPC .............. *H02K 5/24* (2013.01); *H02K 5/06* (2013.01); *H02K 5/207* (2021.01); *H02K 7/083* (2013.01); *H02K 9/06* (2013.01); *H02K 2205/09* (2013.01)

(58) Field of Classification Search
CPC ............ H02K 5/06; H02K 5/207; H02K 5/24; H02K 7/083; H02K 9/06; H02K 2205/09
USPC .......................................................... 310/51
See application file for complete search history.

(56) References Cited

U.S. PATENT DOCUMENTS

| | | | |
|---|---|---|---|
| 11,863,044 B1* | 1/2024 | Zeng | H02K 7/14 |
| 12,081,095 B2* | 9/2024 | Takahashi | H02K 7/08 |
| 2007/0247009 A1* | 10/2007 | Hoffman | F04D 25/0606 |
| | | | 310/43 |
| 2009/0224708 A1 | 9/2009 | Chen et al. | |
| 2013/0251560 A1* | 9/2013 | Xue | F04D 29/444 |
| | | | 417/410.1 |
| 2014/0132096 A1 | 5/2014 | Takeda et al. | |
| 2017/0023016 A1* | 1/2017 | Fischer | F04D 13/0653 |
| 2019/0305627 A1* | 10/2019 | Yoshino | F04D 25/0646 |
| 2020/0169130 A1 | 5/2020 | Kim et al. | |
| 2021/0215159 A1* | 7/2021 | Liu | F04D 29/444 |
| 2024/0136869 A1* | 4/2024 | Nie | H02K 3/522 |

* cited by examiner

*Primary Examiner* — Rashad H Johnson
(74) *Attorney, Agent, or Firm* — Jose Cherson Weissbrot (57) ABSTRACT

The present disclosure discloses a split type motor, including an air channel and an armature module, wherein the armature module includes a housing, a stator assembly, a rotor assembly, and a printed circuit board (PCB); the housing is cylindrical; the rotor assembly includes a rotating shaft, a magnetic ring, a first bearing, and a second bearing; the housing is provided with a first bearing chamber and a second bearing chamber; an elastic component is arranged between the first bearing and the magnetic ring; the air channel includes an inner ring and an outer ring concentrically arranged; the inner ring encloses and forms a circular through cavity matched with the housing; a ventilation cavity is formed between the inner ring and the outer ring; and several flow guide plates are arranged in the ventilation cavity.

10 Claims, 9 Drawing Sheets

SPLIT TYPE MOTOR

TECHNICAL FIELD

The present disclosure relates to the field of motors, in particular, to a split type motor, which is mainly applied to, but not limited to, a blower.

BACKGROUND

A motor is one of the indispensable components of a blower. The power and quality of a motor directly affect the service life and use experience of the blower. In order to reduce the noise generated by the motor of the blower during operation, increase the air intake of the blower, prolong the service life of the motor, and the like, all kinds of motors have emerged on the market.

For example, Chinese patent with the publication number of CN217335308 U discloses a motor for a blower. In order to improve the stability of a rotor during rotation and reduce vibration and noise, in this patent technology, bearings are arranged on a rotating shaft of a rotor assembly, that is, two bearings are arranged on one side of a magnetic ring. Although the vibration can be reduced to a certain extent, this motor still has the following shortcomings. First, an armature of this motor structure cannot be designed to be too long because a too long armature causes the motor to vibrate more severely and make bigger noise during high-speed rotation. Therefore, this motor also has a small power density, so it is not suitable for higher-speed rotation. In addition, an air channel used by this motor needs to be clamped and machined twice on a machine tool after being manufactured and demolded. As a result, the production efficiency is reduced.

There are also motors of other structures. For example, Chinese patent with the publication number of CN217590465 U discloses a motor for a blower. In this patent, bearings are arranged at two ends of a rotor assembly shaft, thus improving the stability. However, this technology also has some shortcomings: Since one bearing chamber is arranged in an air channel and the other bearing chamber is arranged on a rear cap, the straightness of the two bearing chambers is poor. Loads on the two bearings are different when the rotor assembly rotates, which will still make a lot of noise. In addition, the rear cap is locked to the air channel by screws during assembling, so it is difficult to assemble the rear cap.

Therefore, it is necessary to study a new technical solution to solve the above problems.

SUMMARY

In order to solve the defects and shortcomings in the prior art, the present disclosure provides a split type motor. By means of designing the split type motor, the convenience of assembling of the motor is improved. Furthermore, due to the specific design, the motor has the advantages of low noise and stable operation.

In order to achieve the above-mentioned objective, the present disclosure adopts the following technical solution:

A split type motor includes an air channel and an armature module, wherein the armature module comprises a housing, and a stator assembly, a rotor assembly, and a printed circuit board (PCB) which are mounted in the housing; the cylindrical housing is provided with a mounting cavity inside; and a gap communicated with the mounting cavity is arranged on the housing.

The rotor assembly includes a rotating shaft, a magnetic ring arranged on the rotating shaft, a first bearing arranged at an upper end of the rotating shaft, and a second bearing arranged at a lower end of the rotating shaft; correspondingly, the housing is provided with a first bearing chamber matched with the first bearing, and a second bearing chamber matched with the second bearing; an elastic component is arranged between the first bearing and the magnetic ring;

The air channel includes an inner ring and an outer ring concentrically arranged; the inner ring encloses and forms a circular through cavity matched with the housing; a ventilation cavity is formed between the inner ring and the outer ring; and several flow guide plates are arranged in the ventilation cavity.

In a preferable solution, the first bearing chamber is convexly arranged at an upper end of the housing; and the second bearing chamber is convexly arranged at a lower end of the housing.

In a preferable solution, the gap of the housing is arc-shaped, with an arc length greater than ⅓ of a perimeter of the housing and less than ⅔ of the perimeter of the housing.

In a preferable solution, the housing is made of aluminum alloy or zinc alloy or stainless steel.

In a preferable solution, a first glue accommodating groove is arranged on an inner side wall of the second bearing chamber and/or an outer side surface of the second bearing;

or, a first glue accommodating groove is arranged on an inner side wall of the second bearing chamber and/or an outer side surface of the second bearing.

In a preferable solution, the first glue accommodating groove is an annular groove.

In a preferable solution, the rotating shaft is provided with a second glue accommodating groove corresponding to where the bearings are mounted.

In a preferable solution, a lower end face of the inner ring of the air channel is located behind a lower end face of the outer ring, so that an accommodating position for accommodating blades is formed between the lower end face of the inner ring and the lower end face of the outer ring; blades are arranged at the lower end of the rotating shaft; and the blades are located at the accommodating position.

In a preferable solution, the blades are made of hardware or plastic.

In a preferable solution, the flow guide plates are curved at a certain slope; and inclination angles of the flow guide plates gradually decrease from bottom to top.

Compared with the prior art, the present disclosure has the following obvious advantages and beneficial effects. Details are as follows:

1. The two ends of the rotating shaft are respectively provided with the first bearing and the second bearing. Compared with a cantilever arm structure of the existing motor, the rotor assembly of the motor of the present disclosure has a smaller swinging amplitude and low noise. Moreover, the motor of the present disclosure can also ensure the movement stability of the rotor assembly when the armature length is increased to improve the motor power density (increase the air flow rate of the motor during operation).

2. During the machining of the housing, the first bearing chamber and the second bearing chamber are formed. Compared with the prior art, the present disclosure has the advantages that the two bearing chambers are formed by a precision machine tool through one-time clamping and machining, which can ensure the straightness of the first bearing and the second bearing during subsequent assembling, so that loads, generated when the motor works, on the first bearing and the second bearing are more uniform. It is more conducive to reducing the noise of the motor and prolonging the life of the motor.

3. During assembling, the entire armature module is put into the circular through cavity and then is reinforced with glue or is pressed through interference. Compared with the prior art, the present disclosure reduces assembling steps such as locking the armature module with screws, and has higher assembling efficiency.

4. The structure of the air channel is simpler than that of the prior art. The existing air channel needs to be clamped twice after being demolded, while the air channel in the present disclosure only needs to be clamped and machined once for fixing after being demolded. One clamping step is eliminated, and the production efficiency is improved. Moreover, one-time clamping and machining also ensure the product accuracy and product consistency.

5. The elastic component is arranged between the first bearing and the magnetic ring, which can effectively reduce the mechanical noise caused by a bearing clearance of the motor and improve the use experience of the motor (blower).

In order to describe the structural features and effects of the present disclosure more clearly, the present disclosure is described in detail below in combination with the accompanying drawings and specific embodiments.

REFERENCE NUMERALS IN THE DRAWINGS 10. air channel; 11. inner ring; 111. circular through cavity; 12. outer ring; 13. ventilation chamber; 131. flow guide plate; 14. accommodating position; 20. armature module; 21. housing; 211. mounting cavity; 212. gap; 213. first bearing chamber; 2131. first glue accommodating groove; 214. second bearing chamber; 215. wire passing hole; 22. stator assembly; 23. rotor assembly; 231. rotating shaft; 2311. second glue accommodating groove; 232. magnetic ring; 233. first bearing; 234. second bearing; 235. elastic component; 236. first shaft sleeve; 237. second shaft sleeve; 24. PCB; 25. blade.

DETAILED DESCRIPTION OF THE EMBODIMENTS

The technical solutions in the embodiments of the present disclosure will be clearly and completely described below in conjunction with the accompanying drawings. Apparently, the described embodiments are only preferred embodiments of the present disclosure.

It should be noted that when an element is referred to as being "fixed" to another element, it can be directly on the other element or an intermediate element may also exist. When one element is considered to be "connected" to another element, it can be directly connected to another element or there may be a central element at the same time. The terms "perpendicular", "horizontal", "left", "right" and similar expressions used herein are for illustrative purposes only, and are not meant to be the only implementation modes.

Unless otherwise defined, all technical and scientific terms used herein are the same as meanings of general understandings of those skilled in the art of the present disclosure. The terms used in the description of the present disclosure herein are merely to describe the specific implementation modes, not intended to limit the present disclosure. The term "and/or" used herein includes any and all combinations of one or more related listed items.

Referring to FIG. 1 to FIG. 9, a split type motor in an embodiment of the present disclosure includes an air channel 10 and an armature module 20. The armature module 20 includes a housing 21, and a stator assembly 22, a rotor assembly 23, and a PCB 24 which are mounted in the housing 21. The cylindrical housing 21 is provided with a mounting cavity 211 inside. A gap 212 communicated with the mounting cavity 211 is arranged on the housing 21.

The rotor assembly 23 includes a rotating shaft 231, a magnetic ring 232 arranged on the rotating shaft 231, a first bearing 233 arranged at an upper end of the rotating shaft 231, and a second bearing 234 arranged at a lower end of the rotating shaft 231. Correspondingly, the housing 21 is provided with a first bearing chamber 213 matched with the first bearing 233, and a second bearing chamber 214 matched with the second bearing 234. The first bearing chamber 213 is convexly arranged at an upper end of the housing 21, and the second bearing chamber 214 is convexly arranged at a lower end of the housing 21. An elastic component 235 is arranged between the first bearing 233 and the magnetic ring 232.

The air channel 10 includes an inner ring 11 and an outer ring 12 concentrically arranged. The inner ring 11 encloses and forms a circular through cavity 111 matched with the housing 21. A ventilation cavity 13 is formed between the inner ring 11 and the outer ring 12; and several flow guide plates 131 are arranged in the ventilation cavity 13.

During assembling, the stator assembly 22 and the PCB 24 are put into the mounting cavity 211 of the housing 21 from the gap 212 of the housing 21. The rotor assembly 23 is threaded into the second bearing chamber 214 at the lower end of the housing 21 and mounted on the housing 21, thus forming the armature module 20. The entire armature module 20 is put into the circular through cavity of the air channel 10. Furthermore, a surface of the housing 21 that is in contact with the circular through cavity 111 can be coated with glue, so that the armature module 20 and the air channel 10 can be connected more firmly. The connection firmness can be further improved by using interference fit only or by combining interference fit with gluing.

Further, the PCB 24 is arranged at an upper end of the magnetic ring 232, and the housing 21 is provided with a corresponding wire passing hole 215. Preferably, the wire passing hole 215 is arranged at an upper end face of the housing 21, and is located at an edge, so as to facilitate machining on a machine tool. It should be added that in this implementation, since wiring of the PCB 24 adopts a lead wire, the housing 21 is provided with the corresponding wire passing hole. In other embodiments, the wiring of the PCB 24 can also be conducted through a terminal. The PCB 24 welded with a terminal base is exposed from the housing 21, and then the PCB 24 is welded and fixed with the stator assembly 22 through a pin.

Figure 1:
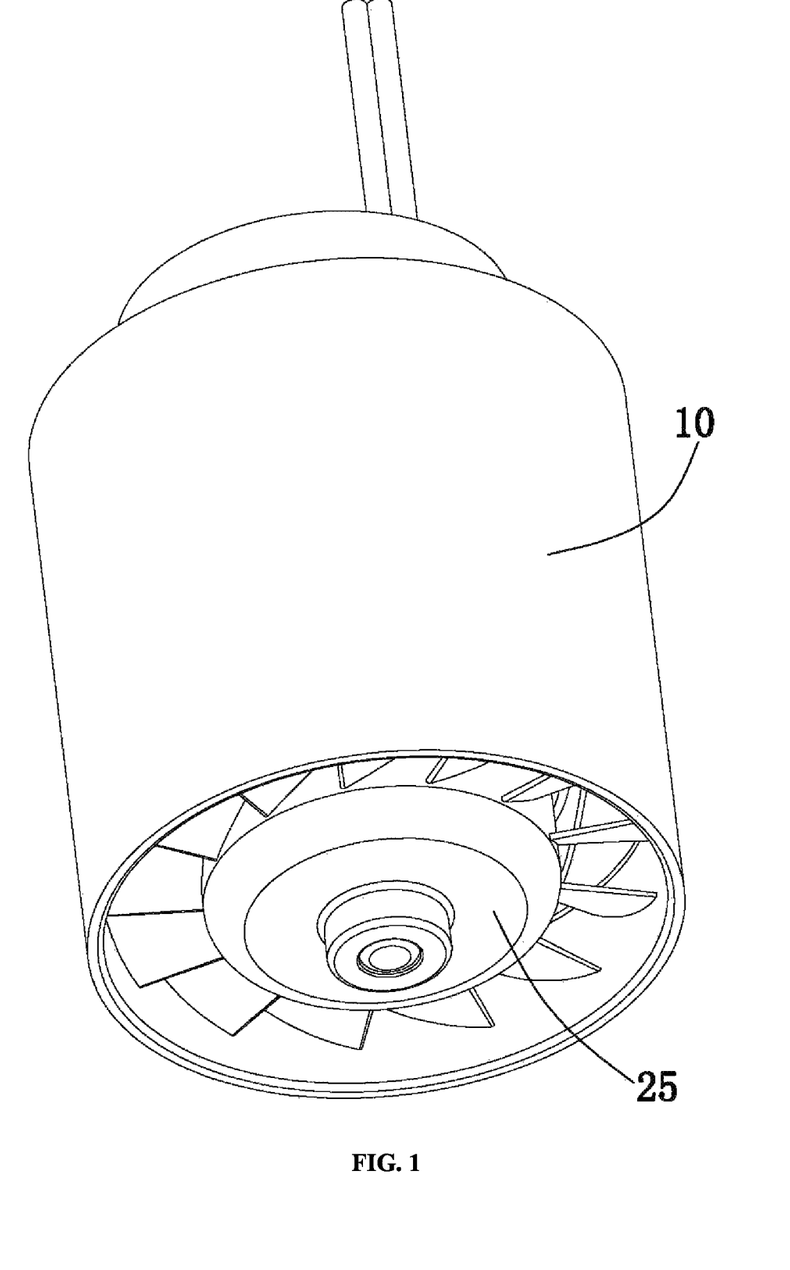
FIG. 1 is a schematic three-dimensional diagram of an embodiment of the present disclosure.
Figure 2:
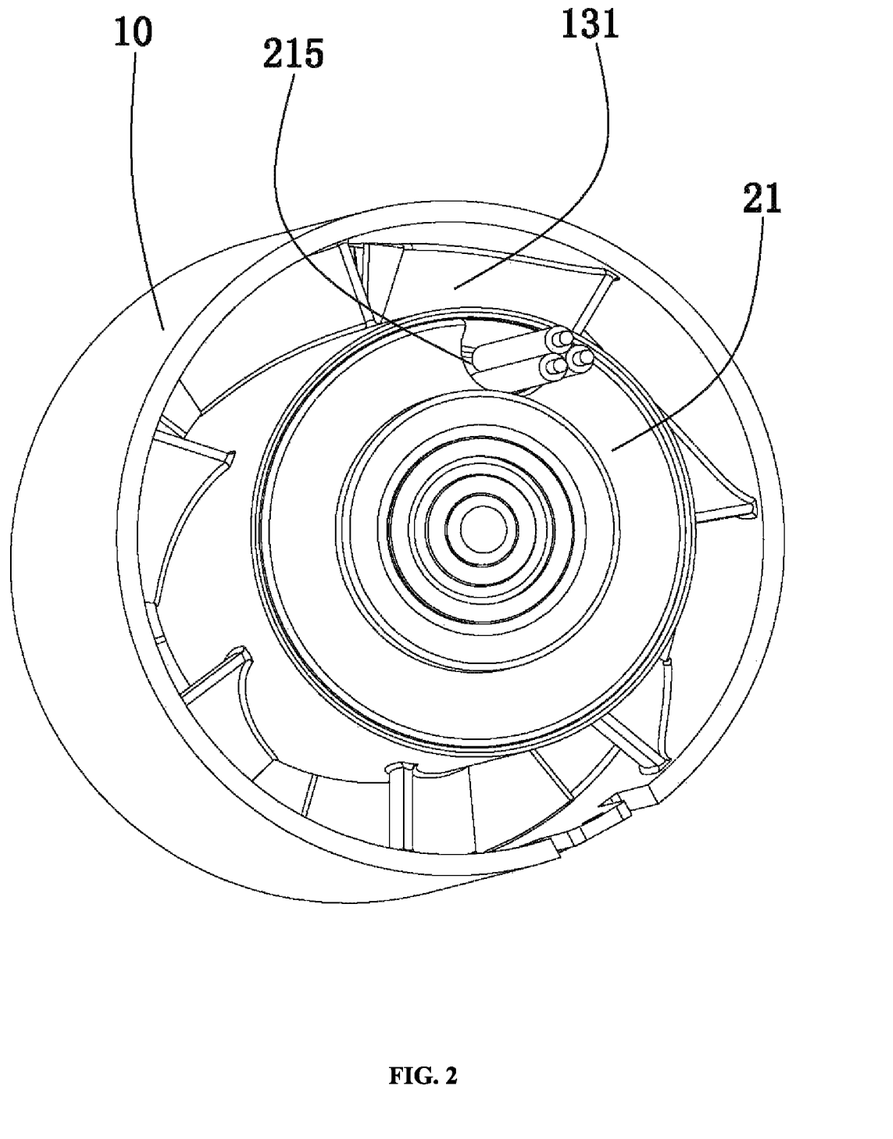
FIG. 2 is a schematic three-dimensional diagram of an embodiment of the present disclosure in another angle.
Figure 3:
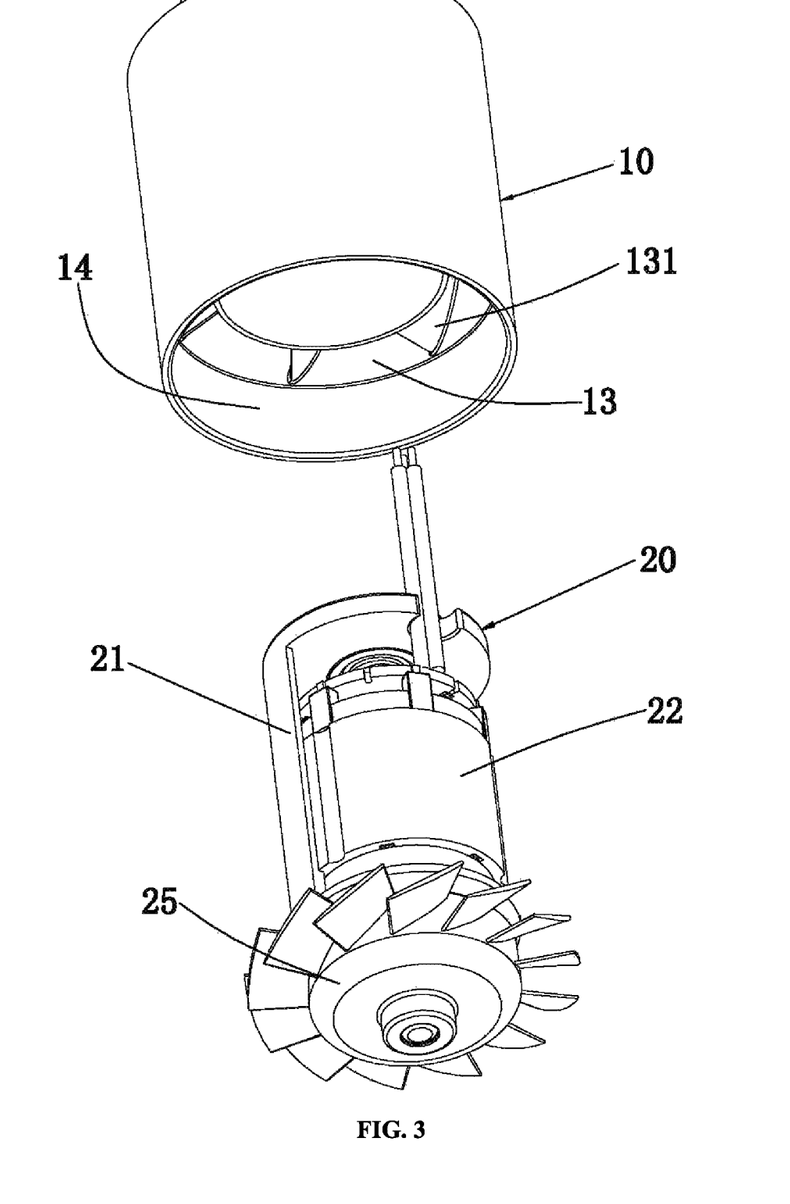
FIG. 3 is a first schematic exploded diagram of an embodiment of the present disclosure.
Figure 4:
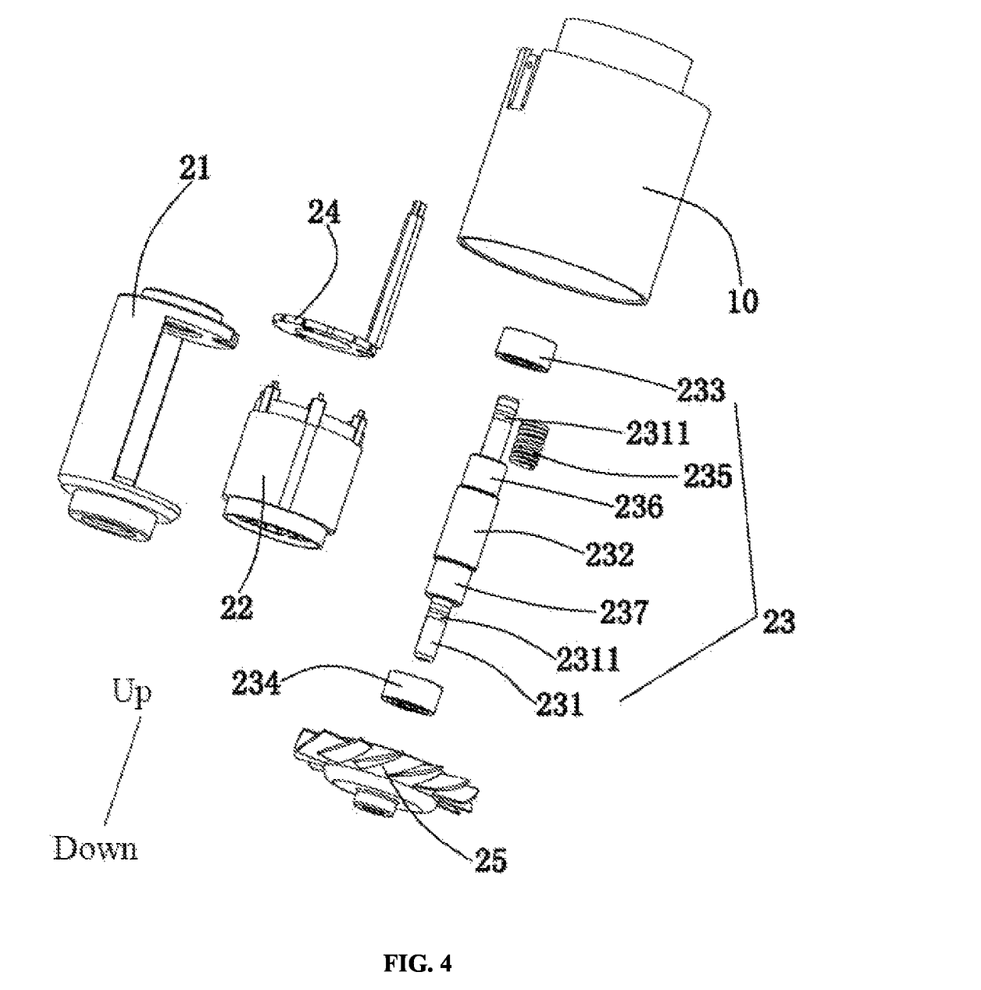
FIG. 4 is a second schematic exploded diagram of an embodiment of the present disclosure.
Figure 5:
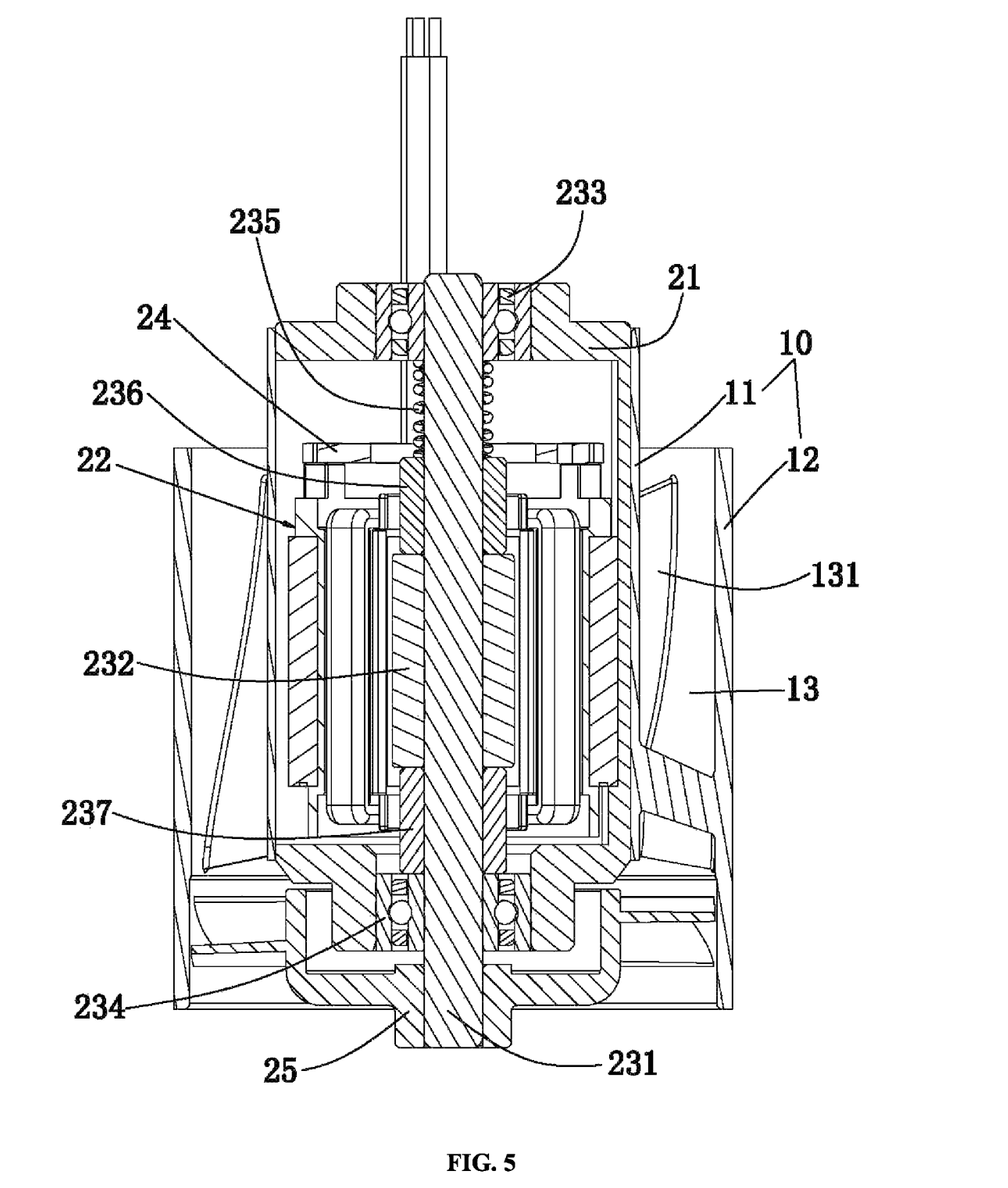
FIG. 5 is a schematic sectional diagram of an embodiment of the present disclosure.
Figure 6:
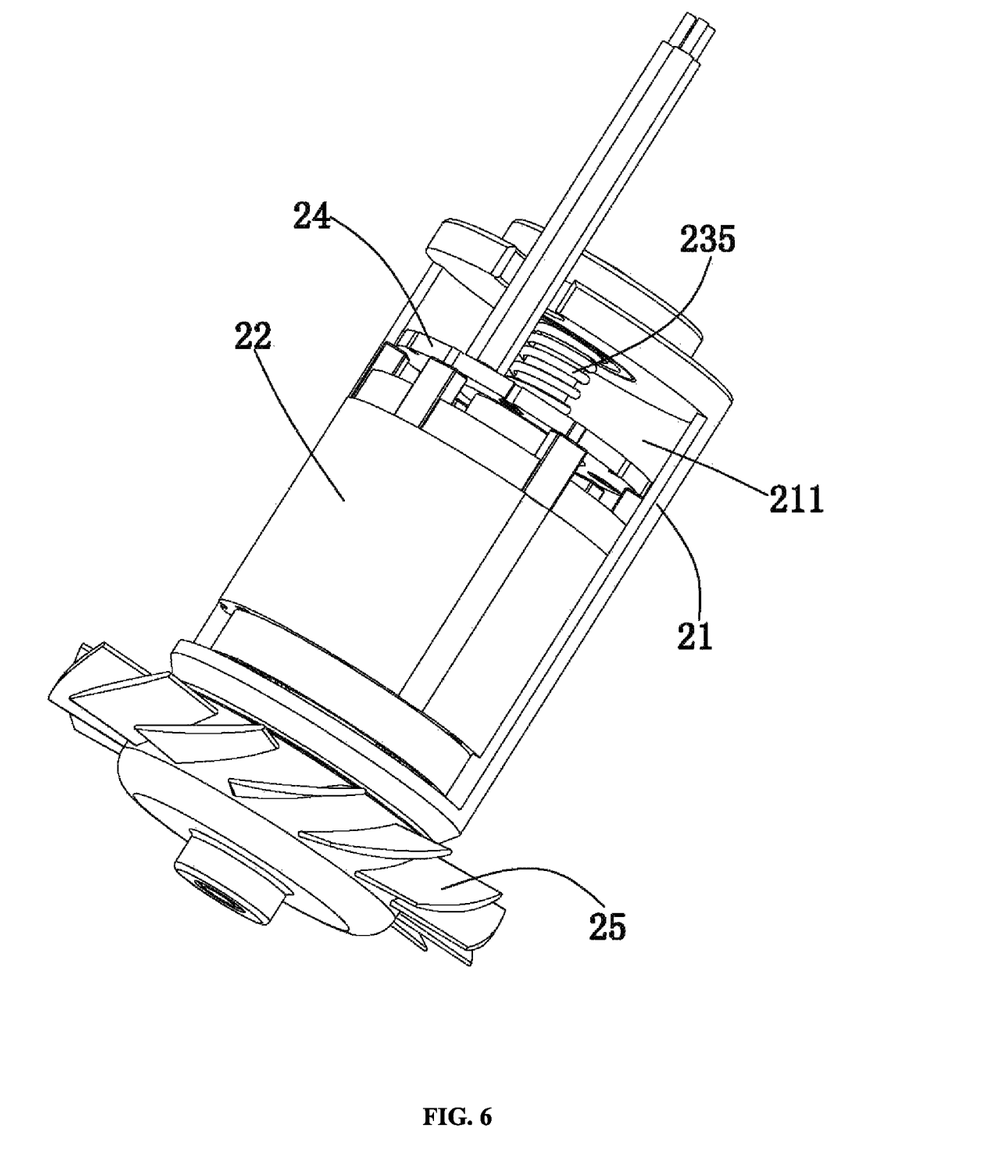
FIG. 6 is a schematic three-dimensional diagram of an armature module in an embodiment of the present disclosure.
Figure 7:
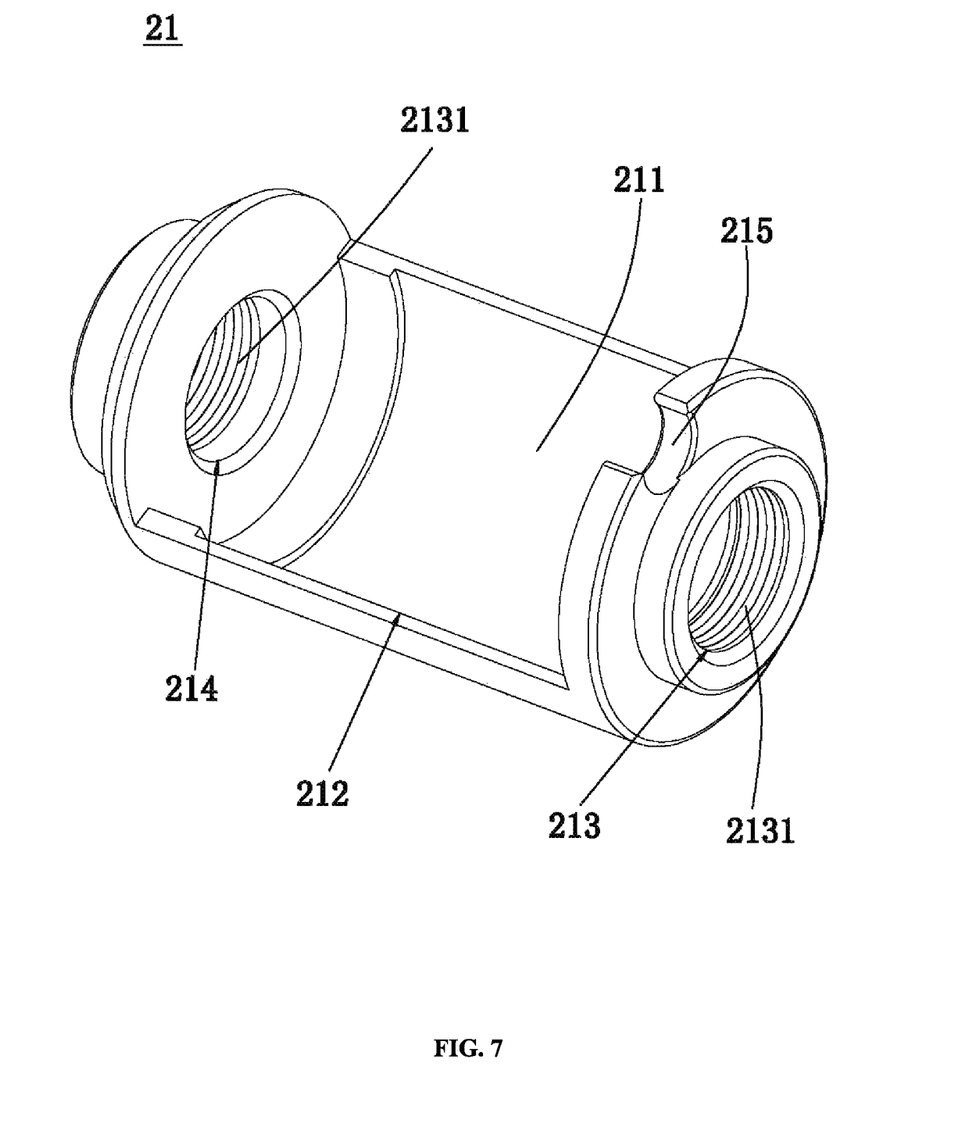
FIG. 7 is a schematic three-dimensional diagram of a housing in an embodiment of the present disclosure.
Figure 8:
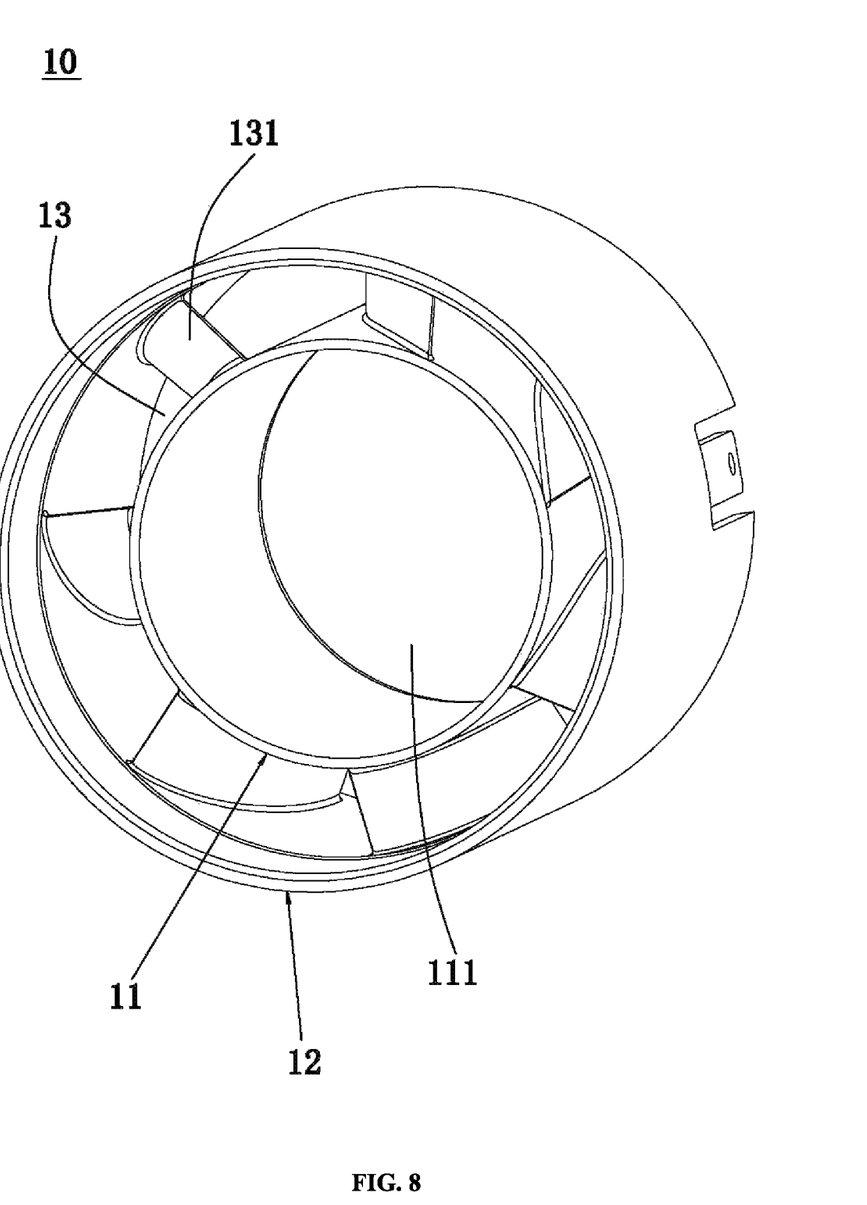
FIG. 8 is a schematic three-dimensional diagram of an air channel in an embodiment of the present disclosure.
Figure 9:
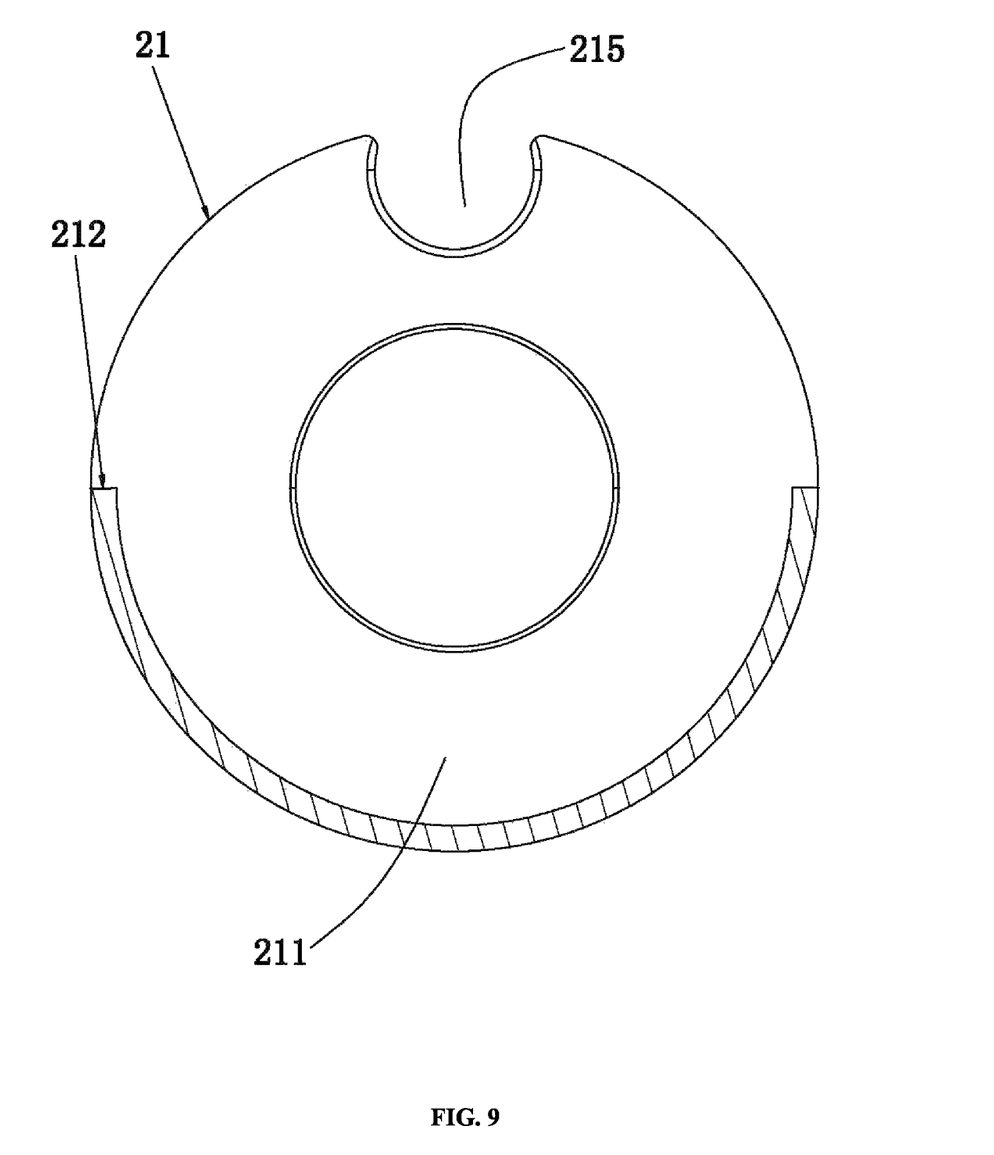
FIG. 9 is a schematic sectional diagram of a housing in an embodiment of the present disclosure.

At the same time, as shown in FIG. 9, the gap 212 of the housing 21 is arc-shaped, with an arc length greater than ⅓ of a perimeter of the housing 21 and less than ⅔ of the perimeter of the housing 21. In practical application, the arc length of the gap 212 is preferably equal to half of the perimeter of the housing 21. In this way, the stator assembly 22 and other elements can be conveniently mounted in the housing 21.

It should be noted that the motor of the present disclosure is mainly applied to, but not limited to, blower products. The present disclosure has the following advantages by improving the motor into a split type:

1. The two ends of the rotating shaft 231 are respectively provided with the first bearing 233 and the second bearing 234. Compared with a cantilever arm structure of the existing motor (such as CN217335308 U and CN21369626, in which, two or one bearing is arranged on one side of the rotating shaft 231), the rotor assembly 23 of the motor of the present disclosure has a smaller swinging amplitude and low noise. Moreover, the motor of the present disclosure can also ensure the movement stability of the rotor assembly 23 when the armature length is increased to improve the motor power density (increase the air flow rate of the motor during operation).

2. The housing 21 is made of hardware (preferably aluminum alloy, and of course, it may also zinc alloy or stainless steel), which is formed by a precision machine tool through one-time clamping and machining During the machining of the housing 21, the first bearing chamber 213 and the second bearing chamber 214 are formed. Compared with the prior art (such as CN217590465 U), the present disclosure has the advantages that the two bearing chambers are formed by the precision machine tool through one-time clamping and machining, which can ensure the straightness of the first bearing 233 and the second bearing 234 during subsequent assembling, so that loads, generated when the motor works, on the first bearing 233 and the second bearing 234 are more uniform. It is more conducive to reducing the noise of the motor and prolonging the life of the motor.

It should be added that through the split design, the concentricity of the two bearing chambers (holes) is smaller, which can reach 0.001 mm. However, in the traditional way of arranging the two bearing chambers on the air channel 10 and a rear cap respectively, the concentricity of the two bearing chambers can only reach 0.01 mm. Thus, the working stability of the motor is further improved, and the working noise is reduced.

3. During assembling, the entire armature module 20 is put into the circular through cavity 111 and then is reinforced with glue or is pressed through interference. Compared with the prior art (such as CN217590465 U), the present disclosure reduces assembling steps such as locking the armature module with screws, and has higher assembling efficiency.

4. The structure of the air channel 10 is simpler than that of the prior art. The existing air channel 10 (such as CN217335308 U and CN217590465 U) needs to be machined on a machine tool after being demolded. Specific machining processes are as follows: first clamping and fixing one end (the upper end) of the air channel 10 to machine the air channel 10; and after the machining is completed, taking out the air channel 10, and clamping and fixing the other end (the lower end) of the air channel 10 to machine one end face (the upper end face) of the air channel 10.

After the air channel 10 of the present disclosure is demolded, the air channel 10 can be machined by only clamping and fixing the upper end of the air channel 10. After the machining is completed, the air channel is taken out. The air channel is finished. One clamping step is eliminated, and the production efficiency is improved. Moreover, one-time clamping and machining also ensure the product accuracy and product consistency.

It should be noted that the air channel 10 in the present disclosure is usually made of hardware (i.e. a metal material, such as zinc). However, the air channel 10 of the present disclosure can also be made of plastic if there is a low requirement for the structural intensity of the air channel 10, thereby further reducing the production cost. That is, the split design of the present disclosure also provides a new idea for manufacturers to control the production cost.

5. The elastic component 235 is arranged between the first bearing 233 and the magnetic ring 232, which can effectively reduce the mechanical noise caused by a bearing clearance of the motor and improve the use experience of the motor (blower). Specifically, the elastic component 235 is a spring. Generally, the rotating shaft 231 is correspondingly provided with a first shaft sleeve 236 and a second shaft sleeve 237 at the upper end and the lower end of the magnetic ring 232. The spring (the elastic component 235) is arranged between the first bearing 233 and the first shaft sleeve 236.

Preferably, a first glue accommodating groove 2131 is arranged on an inner side wall of the first bearing chamber 213 and/or an outer side surface of the first bearing 233. Similarly, the first glue accommodating groove 2131 is preferably arranged on an inner side wall of the second bearing chamber 214 and/or an outer side surface of the second bearing 234. The first glue accommodating groove 2131 is configured to accommodate glue, which further improves the adhesion between the bearing and the bearing chamber, making the bearing connected to the bearing chamber more firmly and work more stably with lower noise. Specifically, the first glue accommodating groove 2131 can be an annular groove. Generally, a groove depth of the annular groove is 0.02 to 0.10 mm. In addition, one to three first glue accommodating grooves 2131 can be arranged on the inner side wall of the first bearing chamber 213 and the inner side wall of the second bearing chamber 214.

Preferably, the rotating shaft 231 can also be provided with a second glue accommodating groove 2311 corresponding to where the bearings are mounted. The second glue accommodating groove 2311 can be configured to accommodate glue, so as to further improve the assembling stability of the rotating shaft 231 and the bearings. Generally, the second glue accommodating groove 2311 is usually an annular groove. A groove depth of the second glue accommodating groove 2311 is generally 0.02 to 0.10 mm. Specifically, the rotating shaft 231 can be provided with one to two second glue accommodating grooves 2311 corresponding to each of the first bearing 233 and the second bearing 234. Of course, the second glue accommodating grooves 2311 can also be a knurled tooth groove.

Further, a lower end face of the inner ring 11 of the air channel 10 is located behind a lower end face of the outer ring 12, so that an accommodating position 14 for accommodating blades 25 is formed between the lower end face of the inner ring 11 and the lower end face of the outer ring 12. Blades 25 are arranged at the lower end of the rotating shaft 231; and the blades 25 are located at the accommodating position 14. Preferably, the blades 25 are made of hardware. Specifically, the blades 25 are preferably made of magnesium aluminum alloy, which has lighter weight, and its structural strength can also meet the working requirements of the motor. There are 13 blades 25. Of course, the blade 25 can also be a traditional aluminum alloy or plastic part.

It should be added that the flow guide plates 131 are vertically arranged. The flow guide plates 131 are curved at a certain slope. Specifically, inclination angles of the flow guide plates 131 gradually decrease from bottom to top. In this way, an air flow can quickly flow out by means of changing a deflected air flow at the front end of the air channel 10 into an axial air flow. Specifically, the front end of the air channel 10 is provided with left and right blades 25. An air flow introduced by the blades 25 have a non-vertical deflection direction. Therefore, the front ends of the flow guide plates 131 are set correspondingly, and the rear ends of the flow guide plates are designed to be straight, so as to guide the air flow to flow axially and be discharged quickly.

The above descriptions are only preferred embodiments of the present disclosure, and do not limit the technical scope of the present disclosure. Therefore, any minor changes, equivalent changes and modifications made to the above embodiments according to the technical essence of the present disclosure still fall within the scope of the technical solutions of the present disclosure.

What is claimed is:

1. A split type motor, comprising an air channel and an armature module, wherein the armature module comprises a housing, and a stator assembly, a rotor assembly, and a printed circuit board (PCB) which are mounted in the housing; the cylindrical housing is provided with a mounting cavity inside; a gap communicated with the mounting cavity is arranged on the housing;

the rotor assembly comprises a rotating shaft, a magnetic ring arranged on the rotating shaft, a first bearing arranged at an upper end of the rotating shaft, and a second bearing arranged at a lower end of the rotating shaft; correspondingly, the housing is provided with a first bearing chamber matched with the first bearing, and a second bearing chamber matched with the second bearing; an elastic component is arranged between the first bearing and the magnetic ring;

the air channel comprises an inner ring and an outer ring concentrically arranged; the inner ring encloses and forms a circular through cavity matched with the housing; a ventilation cavity is formed between the inner ring and the outer ring; and several flow guide plates are arranged in the ventilation cavity.

2. The split type motor according to claim 1, wherein the first bearing chamber is convexly arranged at an upper end of the housing; and the second bearing chamber is convexly arranged at a lower end of the housing.

3. The split type motor according to claim 2, wherein the gap of the housing is arc-shaped, with an arc length greater than ⅓ of a perimeter of the housing and less than ⅔ of the perimeter of the housing.

4. The split type motor according to claim 1, wherein the housing is made of aluminum alloy or zinc alloy or stainless steel.

5. The split type motor according to claim 4, wherein a first glue accommodating groove is arranged on an inner side wall of the first bearing chamber and/or an outer side surface of the first bearing;

or, a first glue accommodating groove is arranged on an inner side wall of the second bearing chamber and/or an outer side surface of the second bearing.

6. The split type motor according to claim 5, wherein the first glue accommodating groove is an annular groove.

7. The split type motor according to claim 4, wherein the rotating shaft is provided with a second glue accommodating groove corresponding to where the bearings are mounted.

8. The split type motor according to claim 4, wherein a lower end face of the inner ring of the air channel is located behind a lower end face of the outer ring, so that an accommodating position for accommodating blades is formed between the lower end face of the inner ring and the lower end face of the outer ring; blades are arranged at the lower end of the rotating shaft; and the blades are located at the accommodating position.

9. The split type motor according to claim 8, wherein the blades are made of hardware or plastic.

10. The split type motor according to claim 9, wherein the flow guide plates are curved at a certain slope; and inclination angles of the flow guide plates gradually decrease from bottom to top.

* * * * *